US010972787B2

(12) United States Patent
Nishi et al.

(10) Patent No.: US 10,972,787 B2
(45) Date of Patent: Apr. 6, 2021

(54) TRANSMISSION METHOD, RECEPTION METHOD, TRANSMITTING DEVICE, AND RECEIVING DEVICE

(71) Applicant: Panasonic Intellectual Property Management Co., Ltd., Osaka (JP)

(72) Inventors: Takahiro Nishi, Nara (JP); Tadamasa Toma, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 16/857,419

(22) Filed: Apr. 24, 2020

(65) Prior Publication Data
US 2020/0252683 A1 Aug. 6, 2020

Related U.S. Application Data

(63) Continuation of application No. 16/025,156, filed on Jul. 2, 2018, now Pat. No. 10,674,203, which is a
(Continued)

(30) Foreign Application Priority Data

Nov. 9, 2015 (JP) .................................. 2015-219847

(51) Int. Cl.
*H04N 21/4402* (2011.01)
*G09G 5/10* (2006.01)
(Continued)

(52) U.S. Cl.
CPC ......... *H04N 21/4402* (2013.01); *G06T 5/009* (2013.01); *G09G 5/10* (2013.01);
(Continued)

(58) Field of Classification Search
CPC ........... H04N 21/4402; H04N 21/2343; H04N 21/235; H04N 21/4316; H04N 21/4318;
(Continued)

(56) References Cited

U.S. PATENT DOCUMENTS

2011/0194618 A1* 8/2011 Gish ...................... H04N 19/59
375/240.25
2014/0037206 A1 2/2014 Newton et al.
(Continued)

FOREIGN PATENT DOCUMENTS

EP 3 021 573 5/2016
EP 3 163 888 5/2017
(Continued)

OTHER PUBLICATIONS

Extended European Search Report dated Jun. 29, 2020 in corresponding European Patent Application No. 20171578.6.
(Continued)

*Primary Examiner* — Alexander Gee
(74) *Attorney, Agent, or Firm* — Wenderoth, Lind & Ponack, L.L.P.

(57) ABSTRACT

A transmission method in the present disclosure includes; obtaining an image and image signal characteristics information indicating one of an opto-electrical transfer function (OETF) or an electro-optical transfer function (EOTF) as image signal characteristics of the image; and transmitting a signal including the image and the image signal characteristics information. According to the transmission method in the present disclosure, a receiving device that received a high dynamic range (HDR) image and a standard dynamic range (SDR) image transmitted through broadcasting or the like can display these images appropriately.

2 Claims, 15 Drawing Sheets

Related U.S. Application Data continuation of application No. 15/616,447, filed on Jun. 7, 2017, now Pat. No. 10,051,319, which is a continuation of application No. PCT/JP2015/005895, filed on Nov. 27, 2015.

(60) Provisional application No. 62/089,509, filed on Dec. 9, 2014.

(51) Int. Cl.

| | | |
|---|---|---|
| *H04N 7/01* | (2006.01) | |
| *G06T 5/00* | (2006.01) | |
| *H04N 21/235* | (2011.01) | |
| *H04N 21/431* | (2011.01) | |
| *H04N 21/435* | (2011.01) | |
| *G06F 3/14* | (2006.01) | |
| *G09G 5/00* | (2006.01) | |
| *H04N 21/2343* | (2011.01) | |

(52) U.S. Cl.
CPC ......... *H04N 7/0125* (2013.01); *H04N 21/235* (2013.01); *H04N 21/2343* (2013.01); *H04N 21/435* (2013.01); *H04N 21/4316* (2013.01); *H04N 21/4318* (2013.01); *G06F 3/14* (2013.01); *G06T 2207/20208* (2013.01); *G09G 5/003* (2013.01); *G09G 2320/0271* (2013.01); *G09G 2320/0613* (2013.01); *G09G 2320/0686* (2013.01); *G09G 2340/12* (2013.01); *G09G 2370/04* (2013.01); *G09G 2370/20* (2013.01)

(58) Field of Classification Search
CPC .... H04N 21/435; H04N 7/0125; G06T 5/009; G06T 2207/20208; G06G 5/10; G06G 5/003; G06F 3/14; G09G 2320/0271; G09G 2320/0613; G09G 2320/0686; G09G 2340/12; G09G 2370/04; G09G 2370/20

See application file for complete search history.

(56) References Cited

U.S. PATENT DOCUMENTS

| | | | | |
|---|---|---|---|---|
| 2014/0210847 | A1* | 7/2014 | Knibbeler | H04N 9/68 345/589 |
| 2015/0245004 | A1* | 8/2015 | Guo | H04N 21/4854 348/453 |
| 2015/0341611 | A1* | 11/2015 | Oh | H04N 5/775 386/230 |
| 2016/0156949 | A1* | 6/2016 | Hattori | H04N 21/2353 725/109 |

FOREIGN PATENT DOCUMENTS

| | | |
|---|---|---|
| IN | 3632MUMNP2015 | 7/2013 |
| JP | 2011-30028 | 2/2011 |
| WO | 2013/059116 | 4/2013 |
| WO | 2014/130213 | 8/2014 |

OTHER PUBLICATIONS

Extended European Search Report dated Jul. 26, 2017 in European Patent Application No. 15867354.1.
Official Communication dated May 18, 2018 in European Application No. 15867354.1.
International Search Report dated Feb. 23, 2016 in International (PCT) Application No. PCT/JP2015/005895.
White Paper Blu-ray Disc Read-Only Format (Ultra HD Blu-ray), Audio Visual Application Format Specifications for BD-ROM Version 3.0, Jul. 2015, Blu-ray Disc Association.
Office Action dated Jan. 21, 2021 in Indian Patent Application No. 201747019819.

* cited by examiner

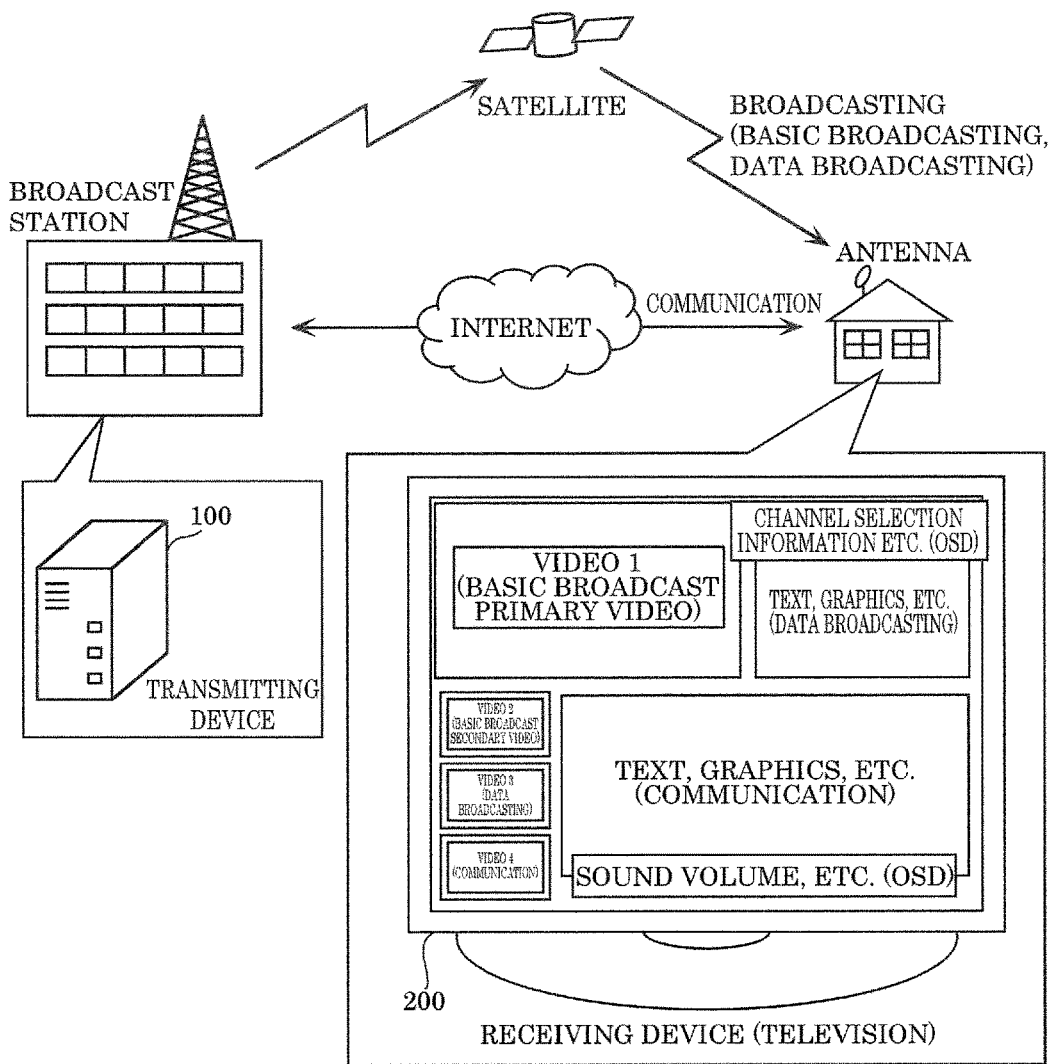
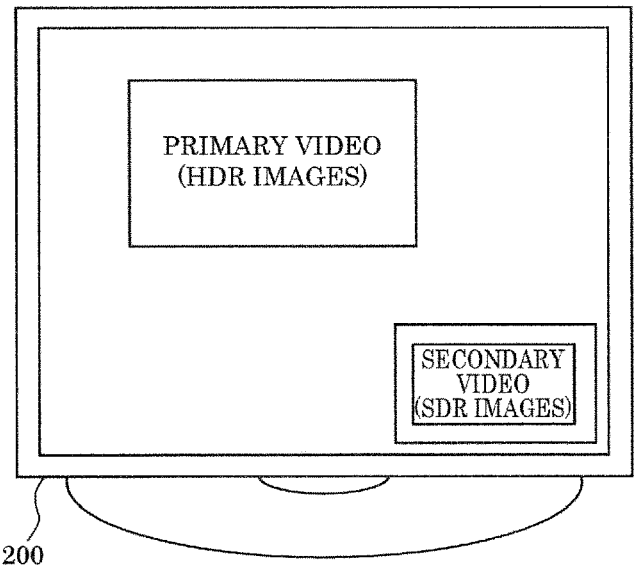

TRANSMISSION METHOD, RECEPTION METHOD, TRANSMITTING DEVICE, AND RECEIVING DEVICE

BACKGROUND

1. Technical Field

The present disclosure relates to a transmission method for transmitting an image or a reception method for receiving the image.

2. Description of the Related Art

In recent years, widening the dynamic range of luminance of video from the standard dynamic range (SDR) to the high dynamic range (HDR) has been considered (for example, see non-patent literature (NPL) 1: White Paper Blu-ray (registered trademark) Disc Read-Only Format (Ultra HD Blu-ray) Audio Visual Application Format Specifications for BD-ROM Version 3.0 July 2015, Blu-ray Disc Association). A broadcast station not only transmits video through normal broadcasting (basic broadcasting), but also transmits text, graphics, etc., through data broadcasting.

SUMMARY

When an HDR image and an SDR image in NPL 1 are transmitted through broadcasting or the like, however, a receiving device is not capable of displaying these images appropriately.

Thus, a non-limiting and exemplary embodiment disclosed herein provides a transmission method and the like that make it possible for a receiving device that received an HDR image and an SDR image transmitted through broadcasting or the like to display these images appropriately.

The transmission method according to one aspect of the present disclosure includes: obtaining an image and image signal characteristics information indicating one of an opto-electrical transfer function (OETF) or an electro-optical transfer function (EOTF) as image signal characteristics of the image; and transmitting a signal including the image and the image signal characteristics information.

Note that these general and specific aspects may be implemented using a system, a method, an integrated circuit, a computer program, or a computer-readable recording medium such as a compact disc read-only memory (CD-ROM), or any combination of systems, methods, integrated circuits, computer programs, or recording media.

Additional benefits and advantages of the disclosed embodiment will be apparent from the specification and drawings. The benefits and advantages may be individually obtained by the various embodiments and features of the specification and drawings, which need not all be provided in order to obtain one or more of such benefits and advantages.

According to the transmission method in the present disclosure, the receiving device that received the HDR image and the SDR image transmitted through broadcasting or the like can display these images appropriately.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 1 illustrates one example of the configuration of a transmitting and receiving system and one example of the screen displayed on a receiving device according to an embodiment;

FIG. 2 illustrates an example in which a receiving device according to an embodiment displays an HDR primary video and an SDR secondary video simultaneously;

Figure 3A:
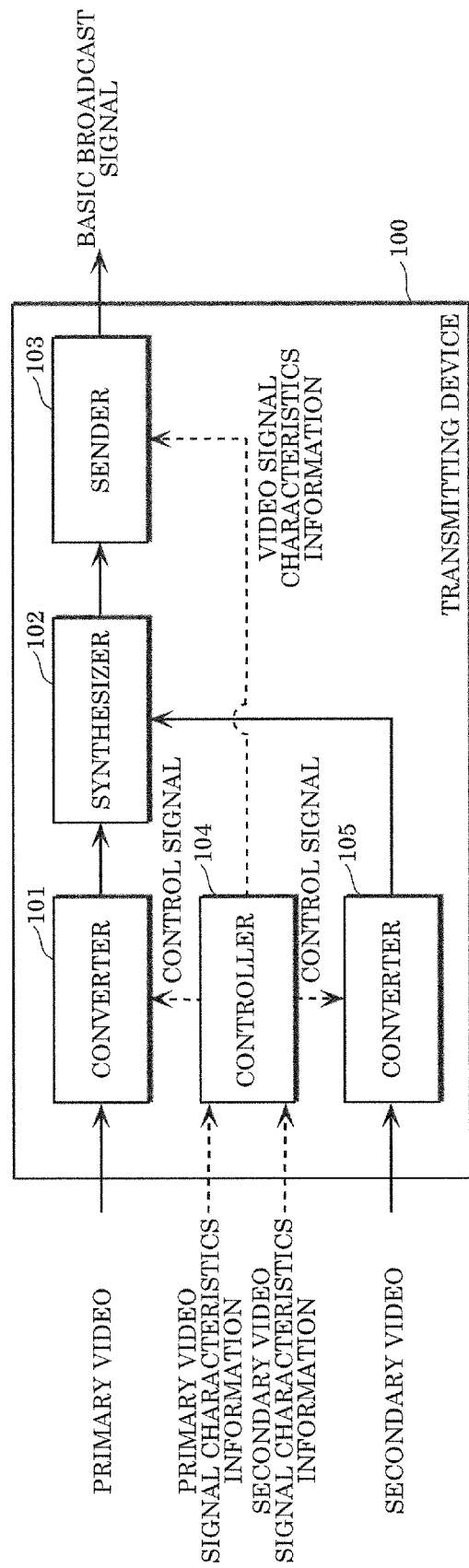
FIG. 3A is a block diagram illustrating one example of the configuration of a transmitting device according to an embodiment.

DETAILED DESCRIPTION OF THE EMBODIMENT (Underlying Knowledge Forming Basis of the Present Disclosure)

In relation to NPL 1 described in the "BACKGROUND" section, the inventors have found the problem indicated below.

In NPL 1, it is presumed that graphics are created with the SDR, and when video on which the graphics are to be superimposed is an HDR video, the dynamic range of the graphics is converted from the SDR into the HDR, and the graphics are displayed with the HDR.

At present, SDR videos are more often provided than HDR videos as video on which graphics are to be superimposed. Therefore, it is reasonable that graphics created with the SDR be provided and only when video on which the graphics are to be superimposed is an HDR video, the dynamic range of the graphics be converted from the SDR into the HDR.

However, as HDR videos become common, the frequency of the dynamic range of graphics being converted into the HDR and the graphics being displayed with the HDR may become higher than the frequency of graphics being displayed with the SDR. Generally, rather than converting graphics created with the SDR into HDR graphics and displaying the graphics with the HDR, it is preferable that graphics created with the HDR be displayed with the HDR because such graphics are displayed as a creator of the graphics intended.

Thus, there is the possibility that along with the spread of HDR videos, graphics created originally with the HDR will be provided as well in the future.

The inventors noticed the above possibility, took the opportunity to start conducting in-depth research, found various problems occurring in a conventionally unexpected environment in which provision of graphics created with the SDR and provision of graphics created with the HDR are mixed, and found solutions for the problems, which will be described in the embodiment below.

In order to solve such various problems, the transmission method according to one aspect of the present disclosure includes: obtaining an image and image signal characteristics information indicating one of an opto-electrical transfer function (OETF) or an electro-optical transfer function (EOTF) as image signal characteristics of the image; and transmitting a signal including the image and the image signal characteristics information.

Thus, according to whether the dynamic range of an image (for example, graphics) for data broadcasting is the SDR or the HDR, a data broadcast signal including image signal characteristics information indicating the corresponding OETF or EOTF is transmitted through data broadcasting. In other words, even in an environment in which provision of graphics created with the SDR through data broadcasting and provision of graphics created with the HDR through data broadcasting are mixed, the corresponding OETF or EOTF is transmitted together with such graphics through data broadcasting. Therefore, even in such an environment, a receiving device, such as a television, can display an image, such as graphics, for data broadcasting with an appropriate dynamic range by using the corresponding OETF or EOTF.

Furthermore, in the obtaining of the image signal characteristics information, when the image is one of text or a graphic, the image signal characteristics information that indicates one of an offset or a scale factor for each code value included in the image, instead of the one of the OETF or the EOTF, may be obtained.

Accordingly, the receiving device can easily convert the image signal characteristics, such as the dynamic range, of an image for the data broadcasting by using the offset or scale factor thereof.

Furthermore, the image may be an image for data broadcasting, and the signal may be a data broadcast signal, in the transmitting of the signal, the data broadcast signal may be transmitted through the data broadcasting, and the transmission method may further include: obtaining video for basic broadcasting different from the data broadcasting; converting, when the image signal characteristics of the image for the data broadcasting and image signal characteristics of the video for the basic broadcasting are different, the image signal characteristics of at least one of the image for the data broadcasting and the video for the basic broadcasting to obtain matched image signal characteristics of the image for the data broadcasting and the video for the basic broadcasting; and transmitting, through the basic broadcasting, a basic broadcast signal including the video for the basic broadcasting and image signal characteristics information indicating the matched image signal characteristics. The image signal characteristics information included in the data broadcast signal may indicate one of the OETF or the EOTF as the matched image signal characteristics.

Accordingly, the image signal characteristics, i.e., OETF or EOTF, of the image for the data broadcasting and the video for the basic broadcasting are unified, and the image signal characteristics information indicating the unified image signal characteristics is transmitted both through basic broadcasting and through data broadcasting. Therefore, the receiving device does not need to switch the OETF or the EOTF for each of the image for the data broadcasting and the video for the basic broadcasting, that is, not need to switch the display process, to display these image and video simultaneously. As a result, it is possible to facilitate mounting of the receiving device. Furthermore, since the image signal characteristics information indicating the unified image signal characteristics is transmitted both through basic broadcasting and through data broadcasting, there is no need of linkage for image signal characteristics between the reception process for basic broadcast and the reception process for data broadcast in the receiving device. As a result, it is possible to facilitate mounting of the receiving device.

For example, the video for the basic broadcasting may be one of a primary video, a secondary video, or a caption corresponding to the primary video. Furthermore, for example, the image signal characteristics information may indicate one of the OETF or the EOTF and at least one of a dynamic range, a color gamut, and a white point as the image signal characteristics.

Furthermore, the reception method according to one aspect of the present disclosure includes: receiving a first image and first image signal characteristics information indicating image signal characteristics of the first image; receiving a second image and second image signal characteristics information indicating image signal characteristics of the second image; converting, when the first image signal characteristics information and the second image signal characteristics information are different, the image signal characteristics of at least one of the first image and the second image to obtain matched image signal characteristics of the first image and the second image; and simultaneously displaying the first image and the second image having the matched image signal characteristics. For example, each of the first image signal characteristics information and the second image signal characteristics information indicates at least one of an opto-electrical transfer function (OETF), an electro-optical transfer function (EOTF), a dynamic range, a color gamut, and a white point as the image signal characteristics.

Accordingly, when the image signal characteristics of the first image are SDR OETF or EOTF, for example, and the image signal characteristics of the second image are HDR OETF or EOTF, for example, the first and second images having the same OETF or EOTF are displayed simultaneously. Thus, it is possible to make the first and second images more eye-friendly.

Furthermore, the above reception method may further include: when, while the first image and the second image are being displayed simultaneously, only the image signal characteristics indicated in the second image signal characteristics information among the first image signal characteristics information and the second image signal characteristics information that are being received switch, converting the image signal characteristics of the second image after the switch or stopping conversion that is being performed on the image signal characteristics of the second image before the switch, to obtain matched image signal characteristics of the first image and the second image; and simultaneously displaying the first image and the second image having the matched image signal characteristics after the conversion of the image signal characteristics of the second image is performed or stopped.

Accordingly, even when only the image signal characteristics of the second image switch, the image signal characteristics of the first and second images being displayed can remain the same before and after the switch. Thus, the feeling of visual discomfort due to the switch can be suppressed.

Furthermore, in the receiving of the first image and the first image signal characteristics information, the first image and the first image signal characteristics information transmitted through data broadcasting may be received, and in the receiving of the second image and the second image signal characteristics information, the second image and the second image signal characteristics information transmitted through basic broadcasting different from the data broadcasting may be received.

Accordingly, for example, even when the first image for the data broadcasting is displayed with the SDR and the image signal characteristics of the second image for the basic broadcasting displayed at the same time as the first image switch from the SDR to the HDR, the second image is continuously displayed with the SDR. Thus, the feeling of visual discomfort due to the switch can be suppressed.

Furthermore, in the receiving of the first image and the first image signal characteristics information, the first image and the first image signal characteristics information transmitted through communication via a communication network may be received, and in the receiving of the second image and the second image signal characteristics information, the second image and the second image signal characteristics information transmitted through broadcasting may be received.

Accordingly, for example, even when the first image for the communication is displayed with the SDR and the image signal characteristics of the second image for broadcasting displayed at the same time as the first image switch from the SDR to the HDR, the second image is continuously displayed with the SDR. Thus, the feeling of visual discomfort due to the switch can be suppressed.

Note that these general and specific aspects may be implemented using a system, a method, an integrated circuit, a computer program, or a computer-readable recording medium such as a compact disc read-only memory (CD-ROM), or any combination of systems, methods, integrated circuits, computer programs, or recording media.

Hereinafter, an embodiment will be specifically described with reference to the drawings.

Note that each embodiment described below shows a general or specific example. The numerical values, shapes, materials, structural elements, the arrangement and connection of the structural elements, steps, the processing order of the steps etc. shown in the following embodiment are mere examples, and are not intended to limit the scope of the present disclosure. Furthermore, among the structural elements in the following embodiment, structural elements not recited in the independent claims indicating the broadest concepts of the present disclosure are described as arbitrary structural elements.

Embodiment

FIG. 1 illustrates one example of the configuration of a transmitting and receiving system and one example of the screen displayed on a receiving device according to the present embodiment.

The transmitting and receiving system includes transmitting device 100 which is a broadcast station and receiving device 200 which is a television or the like placed in a house, for example.

Transmitting device 100 transmits broadcast content to receiving device 200 through broadcasting via a broadcasting network including a satellite. Furthermore, transmitting device 100 transmits communication content to receiving device 200 through communication via a communication network such as the Internet. The broadcast content and the communication content include an image or audio. The image is video, captions, text, or graphics, for example. The broadcasting includes basic broadcasting and data broadcasting, which are different from each other.

Receiving device 200 receives broadcast content and communication content and reproduces the broadcast content and the communication content. As a result of this reproduction, receiving device 200 simultaneously displays a plurality of images included in these contents on the screen of a display device such as a display.

For example, receiving device 200 displays video 1 and video 2, which are basic broadcast primary video and secondary video, data broadcast video 3, data broadcast text or graphics, communication video 4, and communication text or graphics simultaneously. Note that the primary video and the secondary video are videos displayed simultaneously in a picture-in-picture display.

Note that the image included in the content to be transmitted includes an image having luminance in a conventional standard dynamic range (SDR) and an image having luminance in a high dynamic range (HDR) which is several to 100 times wider than the standard dynamic range.

The present embodiment relates to a method and a device for displaying an HDR video and an SDR video simultaneously on the screen of receiving device 200.

FIG. 2 illustrates an example in which receiving device 200 displays an HDR primary video and an SDR secondary video simultaneously.

When transmitting device 100 according to the present embodiment superimposes a plurality of images different in the dynamic range, which is one of image signal characteristics, on one another and sends out the plurality of images as a broadcast signal, transmitting device 100 unifies the image signal characteristics of these images including the opto-electrical transfer function (OETF) or the electro-optical transfer function (EOTF). Transmitting device 100 sends out the plurality of images superimposed on one another and image signal characteristics information including the OETF/EOTF of these images. In the present embodiment, the OETF and EOTF or the OETF or EOTF is referred to as OETF/EOTF.

This eliminates the need for receiving device 200 to switch the display process according to the image signal characteristics for each screen region to display the HDR primary video and the SDR secondary video simultaneously, as illustrated in FIG. 2. Specifically, it is not necessary to switch the OETF/EOTF to be applied to each image. As a result, it is possible to facilitate mounting of receiving device 200.

In the present embodiment, the image signal characteristics and the image signal characteristics information corresponding to an image are referred to as video signal characteristics and video signal characteristics information regardless of whether or not the image is video. The video signal characteristics information indicates characteristics of an images signal (i.e., video signal characteristics), and the characteristics are at least one of the OETF/EOTF, the dynamic range, the color gamut, the white point, and the like.

In the present embodiment, as long as the video signal characteristics of each of the primary video and the secondary video are unified, either the following method (1) or (2) may be performed: (1) converting the video signal characteristics so as to match the video signal characteristics of the primary video; and (2) converting the video signal characteristics into HDR.

By configuring the settings that the video signal characteristics are fixed to one of the video signal characteristics, that is, the HDR or the SDR, within a certain period of time such as one program, it is possible to reduce the frequency of switching of the display process in receiving device 200, and distortion of images due to the switch can be suppressed.

FIG. 3A is a block diagram illustrating one example of the configuration of transmitting device 100 according to the present embodiment.

Transmitting device 100 includes converters 101 and 105, synthesizer 102, sender 103, and controller 104.

Controller 104 obtains primary video signal characteristics information, which is video signal characteristics information of the primary video, and secondary video signal characteristics information, which is video signal characteristics information of the secondary video. Subsequently, in accordance with the primary video signal characteristics information and the secondary video signal characteristics information, controller 104 outputs, to converter 101, a control signal for converting the video signal characteristics of the primary video into the video signal characteristics of the secondary video. Alternatively, in accordance with the primary video signal characteristics information and the secondary video signal characteristics information, controller 104 outputs, to converter 105, a control signal for converting the video signal characteristics of the secondary video into the video signal characteristics of the primary video. Alternatively, in accordance with the primary video signal characteristics information and the secondary video signal characteristics information, controller 104 outputs, to converter 101 or 105, a control signal for converting the video signal characteristics of each of the primary video and the secondary video into the HDR or the SDR.

Furthermore, controller 104 outputs, to sender 103, video signal characteristics information indicating the unified video signal characteristics of both the primary video and the secondary video, that is, the video signal characteristics common to the primary video and the secondary video.

Converter 101 obtains the primary video and converts the video signal characteristics of the primary video on the basis of the control signal output from controller 104. Similarly, converter 105 obtains the secondary video and converts the video signal characteristics of the secondary video on the basis of the control signal output from controller 104.

Synthesizer 102 synthesizes (or superimposes on one another) the primary video and the secondary video output from converters 101 and 104 and outputs the synthesized primary video and secondary video to sender 103.

Sender 103 transmits, as a basic broadcast signal through broadcasting (specifically, the basic broadcasting), a signal including the synthesized primary video and secondary video and the unified video signal characteristics information output from controller 104. Note that sender 103 is a transmitter.

Figure 3B:
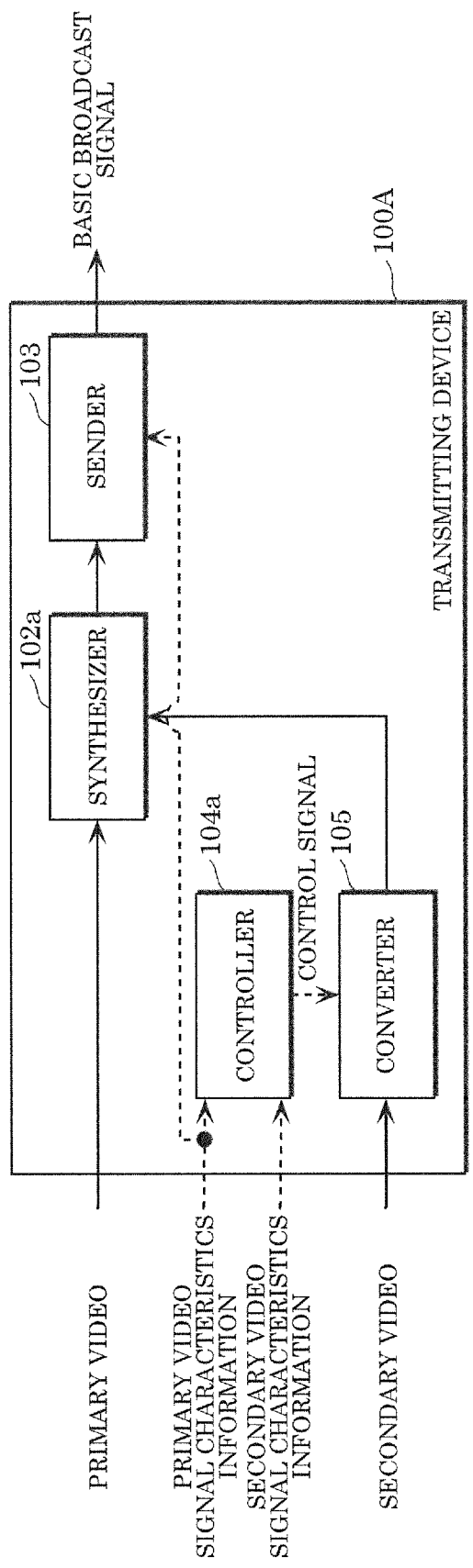
FIG. 3B is a block diagram illustrating another example of the configuration of a transmitting device according to an embodiment.

The transmitting and receiving system according to the present embodiment may include a transmitting device having another configuration, as illustrated in FIG. 3B, instead of transmitting device 100.

FIG. 3B is a block diagram illustrating another example of the configuration of the transmitting device according to the present embodiment.

Transmitting device 100A has a function the same as or similar to that of transmitting device 100 described above and includes synthesizer 102a, sender 103, controller 104a, and converter 105.

Controller 104a obtains primary video signal characteristics information and secondary video signal characteristics information. Subsequently, in accordance with the primary video signal characteristics information and the secondary video signal characteristics information, controller 104 outputs, to converter 105, a control signal for converting the video signal characteristics of the secondary video into the video signal characteristics of the primary video.

Converter 105 obtains the secondary video and converts the video signal characteristics of the secondary video on the basis of the control signal output from controller 104a.

Synthesizer 102a obtains the primary video, synthesizes (or superimposes on one another) the primary video and the secondary video output from converter 105, and outputs the synthesized primary video and secondary video to sender 103.

Sender 103 transmits, as a basic broadcast signal through broadcasting (specifically, the basic broadcasting), a signal including the synthesized primary video and secondary video and the primary video signal characteristics information. This primary video signal characteristics information indicates the unified video signal characteristics of both the primary video and the secondary video, that is, the video signal characteristics common to the primary video and the secondary video.

In such transmitting devices 100 and 100A, converter 101 or 105 converts a primary or secondary video signal from an SDR signal into an HDR signal or from an HDR signal into an SDR signal according to the control signal.

Figure 4:
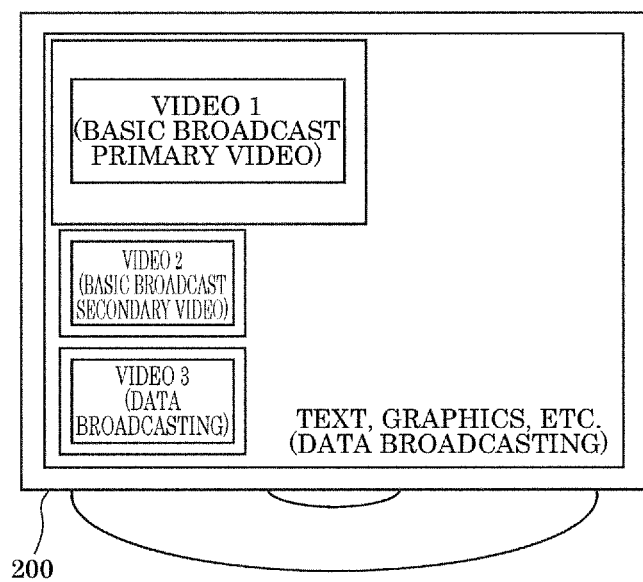
FIG. 4 illustrates an example in which a receiving device according to an embodiment displays a basic broadcast video, a data broadcast video, etc., simultaneously.

FIG. 4 illustrates an example in which receiving device 200 displays a basic broadcast video, a data broadcast video, etc., simultaneously.

Receiving device 200 displays, for example, video 1 and video 2, which are basic broadcast primary video and secondary video, data broadcast video 3, and data broadcast text or graphics simultaneously.

Here, there are cases where the basic broadcast primary video, the basic broadcast secondary video, and the data broadcast image (video, text, or graphics) are different in the video signal characteristics such as the dynamic range.

Figure 5:
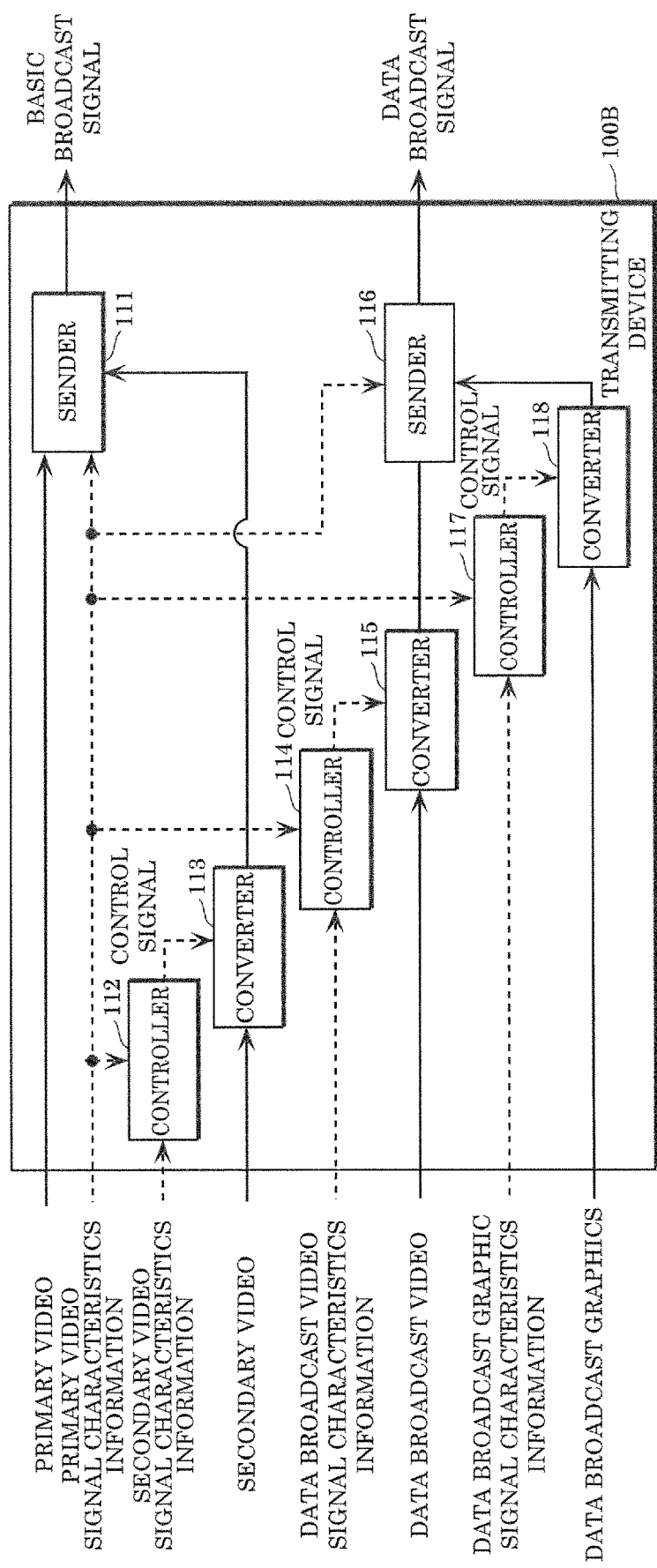
FIG. 5 is a block diagram illustrating another example of the configuration of a transmitting device according to an embodiment.

In such a case, the transmitting and receiving system according to the present embodiment may include a transmitting device that unifies the video signal characteristics by changing the video signal characteristics of each image other than the basic broadcast primary video into the video signal characteristics of the basic broadcast primary video, as illustrated in FIG. 5, instead of transmitting device 100 or 100A. This eliminates the need for receiving device 200 to switch the video signal characteristics information for each type of broadcasting, making it possible to facilitate mounting of receiving device 200.

FIG. 5 is a block diagram illustrating another example of the configuration of the transmitting device according to the present embodiment.

Transmitting device 100B includes senders (transmitters) 111 and 116, controllers 112, 114, and 117, and converters 113, 115, and 118.

Controller 112 obtains primary video signal characteristics information and secondary video signal characteristics information. Subsequently, in accordance with the primary video signal characteristics information and the secondary video signal characteristics information, controller 112 outputs, to converter 113, a control signal for converting the video signal characteristics of the secondary video into the video signal characteristics of the primary video.

Converter 113 obtains the secondary video and converts the video signal characteristics of the secondary video on the basis of the control signal output from controller 112.

Sender 111 obtains the primary video, the primary video signal characteristics information, and the secondary video output from converter 113, and transmits a signal including these as a basic broadcast signal through the basic broadcasting.

Controller 114 obtains data broadcast video signal characteristics information, which is video signal characteristics information of the data broadcast video, and the primary video signal characteristics information. Subsequently, in accordance with the data broadcast video signal characteristics information and the primary video signal characteristics information, controller 112 outputs, to converter 115, a control signal for converting the video signal characteristics of the data broadcast video into the video signal characteristics of the primary video.

Converter 115 obtains a data broadcast video, which is video for data broadcasting, and converts the video signal characteristics of the data broadcast video on the basis of the control signal output from controller 114.

Controller 117 obtains data broadcast graphic signal characteristics information, which is video signal characteristics information of data broadcast text or graphics, and primary video signal characteristics information. Subsequently, in accordance with the data broadcast graphic signal characteristics information and the primary video signal characteristics information, controller 117 outputs, to converter 118, a control signal for converting the video signal characteristics of the data broadcast text or graphics into the video signal characteristics of the primary video.

Converter 118 obtains data broadcast graphics, which are text or graphics for data broadcasting, and converts the video signal characteristics of the data broadcast graphics on the basis of the control signal output from controller 117.

Sender 116 obtains the primary video signal characteristics information, the data broadcast video output from converter 115, and the data broadcast graphics output from converter 118, and transmits a signal including these as a data broadcast signal through the data broadcasting.

As described above, transmitting device 100B according to the present embodiment includes the video signal characteristics information in each of the basic broadcast signal and the data broadcast signal. This eliminates the need of linkage for video signal characteristics between the process of receiving the basic broadcast signal and the process of receiving the data broadcast signal in receiving device 200, making it possible to facilitate mounting of receiving device 200.

In the case where receiving device 200 can always receive and process the basic broadcast signal and the data broadcast signal in pairs, transmitting device 100B may omit the video signal characteristics information included in the data broadcast signal. In this case, the transmission method according to the present embodiment includes: obtaining an image for the data broadcasting and video for the basic broadcasting different from the data broadcasting; converting, when the image signal characteristics of the image for the data broadcasting and the image signal characteristics of the video for the basic broadcasting are different, the image signal characteristics of at least one of the image for the data broadcasting and the video for the basic broadcasting to obtain matched image signal characteristics of the image for the data broadcasting and the video for the basic broadcasting; transmitting, through the data broadcasting, a data broadcast signal including the image for the data broadcasting; and transmitting, through the basic broadcasting, a basic broadcast signal including the video for the basic broadcasting and image signal characteristics information indicating the matched image signal characteristics.

Figure 6:
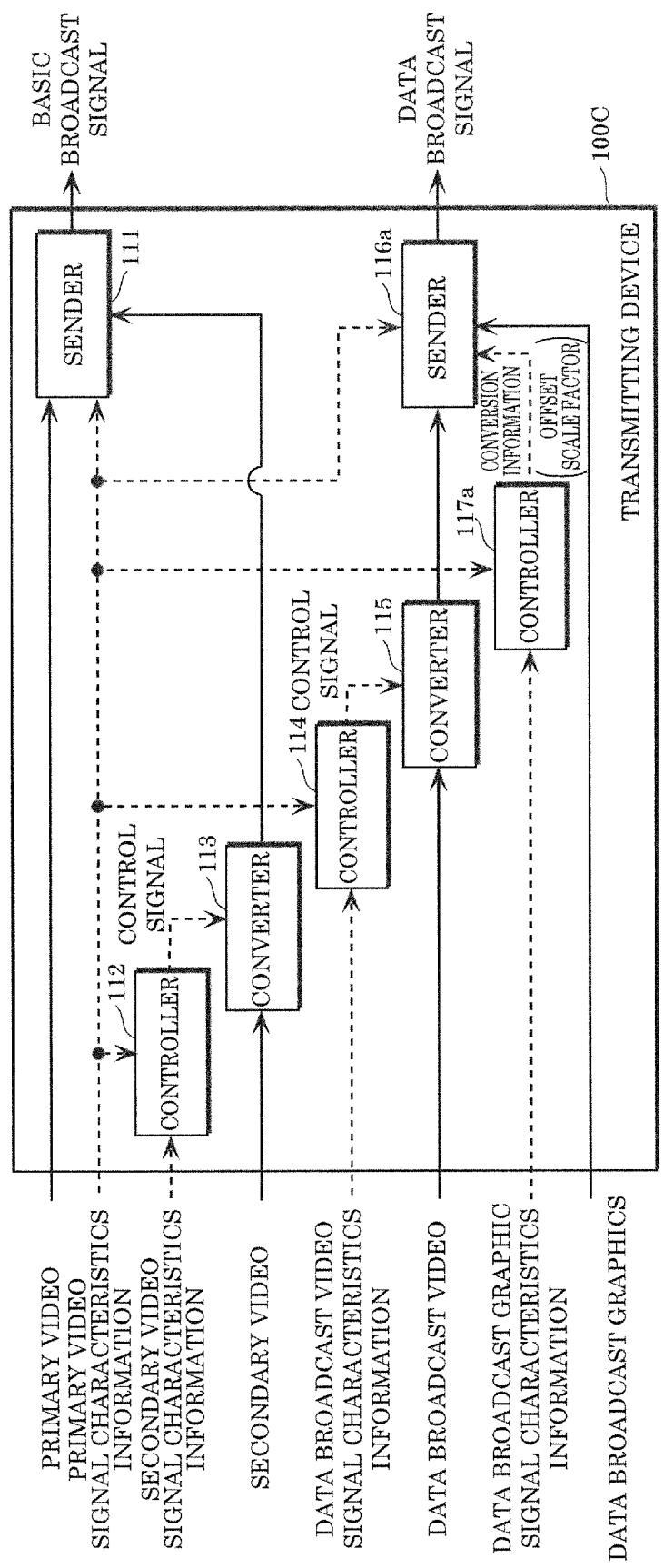
FIG. 6 is a block diagram illustrating another example of the configuration of a transmitting device according to an embodiment.

The transmitting and receiving system according to the present embodiment may include a transmitting device having another configuration, as illustrated in FIG. 6, instead of transmitting device 100B.

FIG. 6 is a block diagram illustrating another example of the configuration of the transmitting device according to the present embodiment.

Transmitting device 100C includes senders (transmitters) 111 and 116a, controllers 112, 114, and 117a, and converters 113 and 115.

Controller 117a obtains data broadcast graphic signal characteristics information, which is video signal characteristics information of data broadcast text or graphics, and primary video signal characteristics information. Subsequently, in accordance with the data broadcast graphic signal characteristics information and the primary video signal characteristics information, controller 117a outputs, to sender 116a, conversion information for converting the video signal characteristics of the data broadcast text or graphics into the video signal characteristics of the primary video. The conversion information is, specifically, an offset, a scale factor, or the like.

Sender 116a obtains the conversion information output from controller 117a, the primary video signal characteristics information, the data broadcast video output from converter 115, and the data broadcast graphics, and transmits a signal including these as a data broadcast signal through the data broadcasting.

In transmitting device 100C, the conversion information (such as an offset or a scale factor) is transmitted without conversion of the video signal characteristics of data broadcast text or graphics. This allows receiving device 200 to easily convert the video signal characteristics (for example, the dynamic range) of the data broadcast text or graphics so as to match the video signal characteristics of the basic broadcast primary video.

As described above, in the transmission method according to the present embodiment, the image for the data broadcasting and the image signal characteristics information indicating one of the OETF or the EOTF as the image signal characteristics of the image are obtained. Subsequently, the data broadcast signal including the image for the data broadcasting and the image signal characteristics information is transmitted through the data broadcasting. Here, in the obtaining of the image signal characteristics information, when the image is one of text or graphics, the image signal characteristics information that indicates one of an offset or a scale factor for each code value included in the image, instead of the one of the OETF or the EOTF, may be obtained.

Furthermore, in the transmission method according to the present embodiment, the video for the basic broadcasting different from the data broadcasting is further obtained. When the image signal characteristics of the image for the data broadcasting and the image signal characteristics of the video for the basic broadcasting are different, the image signal characteristics of at least one of the image for the data broadcasting and the video for the basic broadcasting is converted to obtain matched image signal characteristics of the image for the data broadcasting and the video for the basic broadcasting. Next, the basic broadcast signal including the video for the basic broadcasting and image signal characteristics information indicating the matched image signal characteristics is transmitted through the basic broadcasting. Here, the image signal characteristics information included in the data broadcast signal indicates the OETF or the EOTF as the matched image signal characteristics.

Here, the conversion of the video signal characteristics is specifically described below.

Figure 7:
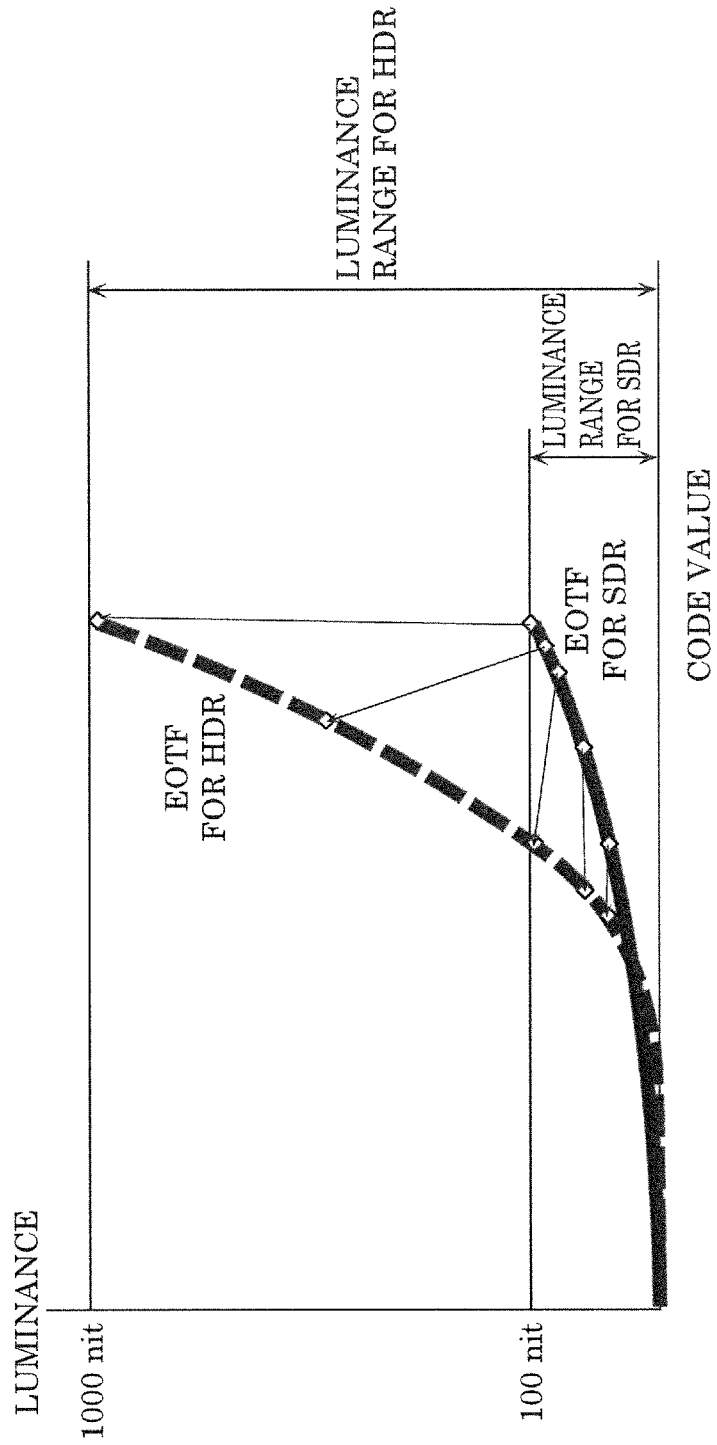
FIG. 7 illustrates an HDR EOTF and an SDR EOTF according to an embodiment.

FIG. 7 illustrates an HDR EOTF and an SDR EOTF.

When each of the above-described converters converts the dynamic range, which is one of the video signal characteristics of an image, from the SDR into the HDR, the converter converts a code value of an SDR EOTF included in the image into a code value of an HDR EOTF. FIG. 7 illustrates a conversion example of code values when the dynamic range is converted from the SDR having the peak luminance of 100 nit into the HDR having the peak luminance of 1,000 nit.

In the example illustrated in FIG. 7, each of the above converters converts the code value of an SDR EOTF into a code value of an HDR EOTF so that the luminance range (the dynamic range) of an SDR image is converted into the luminance value of an HDR image. Each of the above converters, however, may convert the code value of an SDR EOTF into a code value of an HDR EOTF so that the luminance range of an SDR image is not converted. In this case, each of the above converters converts the code value of the SDR EOTF so that the luminance corresponding to the code value of an SDR EOTF before the conversion becomes the same as the luminance corresponding to the code value of an HDR EOTF after the conversion. In other words, each of the above converters converts the code value of the SDR EOTF by horizontally projecting a point in the SDR EOTF onto a curve of the HDR EOTF.

As a result of such conversion of the code value, the video signal characteristics of the image are converted. Furthermore, the video signal characteristics of a plurality of images are unified by such conversion. As a result, in receiving device 200, the EOTF/OETF (the video signal characteristics information) to be applied to these images are also unified. Consequently, there is no need for receiving device 200 to switch the display process according to the image signal characteristics for each screen region to display the HDR primary video and the SDR secondary video simultaneously, as illustrated in FIG. 2. Specifically, it is not necessary to switch the OETF/EOTF to be applied to each image. As a result, it is possible to facilitate mounting of receiving device 200.

Here, the peak luminance for the HDR may be either an absolute value or a relative value such as a scaling factor to dynamic range SDR. Furthermore, the peak luminance may be included in auxiliary information of a multiplexing layer for data broadcasting.

As the multiplexing layer, the MPEG-2 transport stream (TS), the MPEG-H MMT (MPEG Media Transport), or the like is used. The auxiliary information is stored by a section of the TS or a descriptor in a message of the MMT, for example. Furthermore, when the dynamic range is switched in units of programs, the transmitting device may indicate, in program information such as an event information table (EIT), whether a program has the SDR or the HDR.

The peak luminance for the HDR in converting of the dynamic range into the HDR may be a default value preset in receiving device 200 or may be a value obtained using the default value. For example, when data transmitted through broadcasting, communication, or the like includes conversion information indicating, for example, the peak luminance to be used in conversion into the HDR, receiving device 200 converts the dynamic range into the HDR according to the peak luminance. When such conversion information is not included, receiving device 200 may convert the dynamic range into the HDR according to a default value that is set therein or a value obtained using the default value. Receiving device 200 can convert the dynamic range from the HDR into the SDR likewise as well.

As the HDR EOTF, it is possible to use a hybrid EOTF which allows the same code value to be applied to both the HDR and the SDR. For example, when receiving device 200 superimposes image 2 having the SDR on image 1 of the hybrid type having the HDR and outputs these images as SDR images, it is possible to superimpose the images assuming that the pixel values of both image 1 and image 2 are in the SDR. Therefore, the transmitting device may add, as an HDR attribute of the primary video, the secondary video, the data broadcast image, or the like, information for identifying whether or not such video or image is of the hybrid type.

Figure 8:
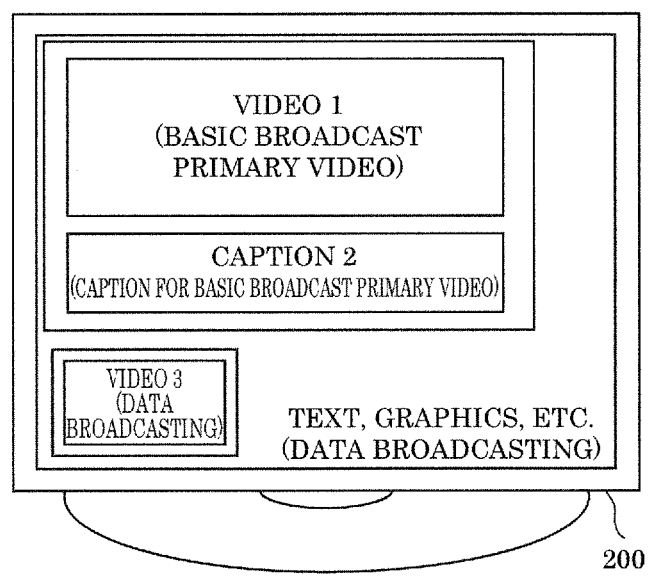
FIG. 8 illustrates an example in which a receiving device according to an embodiment displays a basic broadcast caption and another video simultaneously.

FIG. 8 illustrates an example in which receiving device 200 displays a basic broadcast caption and another video simultaneously.

Receiving device 200 displays, for example, video 1, which is a basic broadcast primary video, caption 1, which is a caption for the basic broadcast primary video, data broadcast video 3, and data broadcast text or graphics simultaneously. In the present embodiment, the video for the basic broadcasting is the primary video, the secondary video, or the caption corresponding to the primary video.

The transmitting device (any one of transmitting devices 100 and 100A to 100C described above) transmits the basic broadcast caption independently of video such as the primary video and the secondary video. Before sending the caption, the transmitting device changes the video signal characteristics of a caption so that these video signal characteristics and the video signal characteristics of the video on which the caption is to be superimposed are unified.

The caption is described in an extensible markup language (XML)-based language such as the timed text markup language (TTML) of the world wide web consortium (W3C), and the color or the luminance value of the caption is represented by RGB values. Therefore, information for identifying whether the RGB value designated in the XML corresponds to the OETF/EOTF for the SDR or the HDR may be added to the XML document or may be transmitted as video signal characteristics information of the whole caption.

The data broadcast is configured by an application such as the hypertext markup language (HTML). Video signal characteristics information in the data broadcast may indicate the SDR or the HDR as the video signal characteristics of the whole application. Furthermore, using an HTML tag or the like, the video signal characteristics information in the data broadcast may indicate whether each of moving images, still images, and text to be referred to by the HTML has the SDR or the HDR.

Examples of the video signal characteristics of a plurality of images including captions to be displayed simultaneously include not only the dynamic range, but also the color gamut. Especially, in a high-resolution image having 4K resolution or the like, it is assumed that not only the existing BT. 709 (Recommendation ITU-R BT. 709), but also BT. 2020 (Recommendation ITU-R BT. 2020) which enables representation of a wider color gamut than that in BT. 709 will be used. When receiving device 200 displays images different in the color gamut simultaneously, it is necessary to change the color gamut of one of the images into that of the other to unify the color gamut. In this case as well, on the basis of criteria similar to those for the dynamic range (or the OETF/EOTF), the transmitting device (or receiving device 200) can determine the color gamut that is to be chosen as the unified color gamut.

Figure 9:
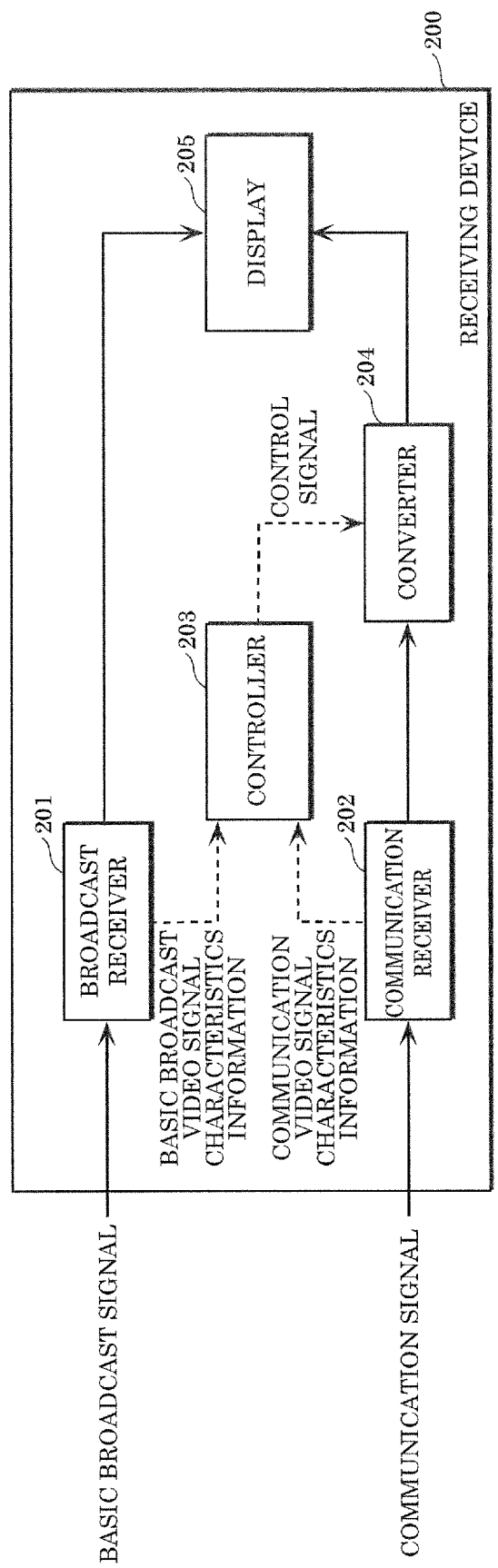
FIG. 9 is a block diagram illustrating one example of the configuration of a receiving device according to an embodiment.

FIG. 9 is a block diagram illustrating one example of the configuration of receiving device 200 according to the present embodiment.

Receiving device 200 includes broadcast receiver 201, communication receiver 202, controller 203, converter 204, and display 205.

Broadcast receiver 201 receives a basic broadcast signal and outputs video included in the basic broadcast signal to display 205. At this time, broadcast receiver 201 may apply, to the video, video signal characteristics information included in the basic broadcast signal, thereby converting the data format of the video into a format supported by display 205. For example, broadcast receiver 201 applies the EOTF to convert a code value included in the video into luminance. Broadcast receiver 201 outputs such video in the converted data format to display 205. Furthermore, broadcast receiver 201 outputs, as basic broadcast video signal characteristics information to controller 203, the video signal characteristics information included in the basic broadcast signal.

Communication receiver 202 receives a communication signal, outputs video included in the communication signal to converter 204 as a communication video, and outputs video signal characteristics information included in the communication signal to controller 203 as communication video signal characteristics information. The communication signal is a signal transmitted through communication via a communication network such as the Internet.

Controller 203 obtains the basic broadcast video signal characteristics information and the communication video signal characteristics information. Subsequently, on the basis of the basic broadcast video signal characteristics information and the communication video signal characteristics information, controller 104 outputs, to converter 204, a control signal for converting the video signal characteristics of the communication video into the video signal characteristics of the basic broadcast video.

Converter 204 obtains the communication video from communication receiver 202 and converts the video signal characteristics of the communication video on the basis of the control signal output from controller 203. Furthermore, converter 204 may obtain the basic broadcast video signal characteristics information from broadcast receiver 201 via controller 203 and apply the basic broadcast video signal characteristics information to the communication video having the converted video signal characteristics. By this application, converter 204 converts the data format of the communication video into a data format supported by display 205. For example, converter 204 applies the EOTF to convert a code value included in the communication video into luminance. Note that "luminance" herein is not limited to the weighted sum of RGB components and may be the intensity of each of the RGB components, may be the degree of brightness of light, or may be the intensity of light. Converter 204 outputs such a communication video in the converted data format to display 205.

Display 205 is a display device and displays the basic broadcast video output from broadcast receiver 201 and the communication video output from converter 204 simultaneously.

There are cases where even when the video signal characteristics of the basic broadcast and the data broadcast are unified by transmitting device 100 described above or the like, these video signal characteristics do not match the video signal characteristics for the communication (for example, the OETF/EOTF or the dynamic range). In such a case, receiving device 200 according to the present embodiment converts the video signal characteristics of the communication video so that the video signal characteristics of the communication matches the video signal characteristics of the broadcast, and displays the communication video after the conversion. Thus, it is possible to make the communication video more eye-friendly.

Note that regarding any of these images, it is sufficient that the video signal characteristics thereof be unified; the video signal characteristics of the images may be unified on the basis of the data broadcast image, the communication image, or the like.

Receiving device 200 may change the video signal characteristics (such as brightness, hue, or contrast) of an on-screen display (OSD) such as the channel selection information or sound volume to be displayed on display 205, according to the video signal characteristics of the basic broadcast. For example, when the dynamic range of the basic broadcast video is the HDR, receiving device 200 can increase the contrast of the OSD such as the channel selection information or the sound volume in displaying the video so that the visibility thereof is improved.

Figure 10:
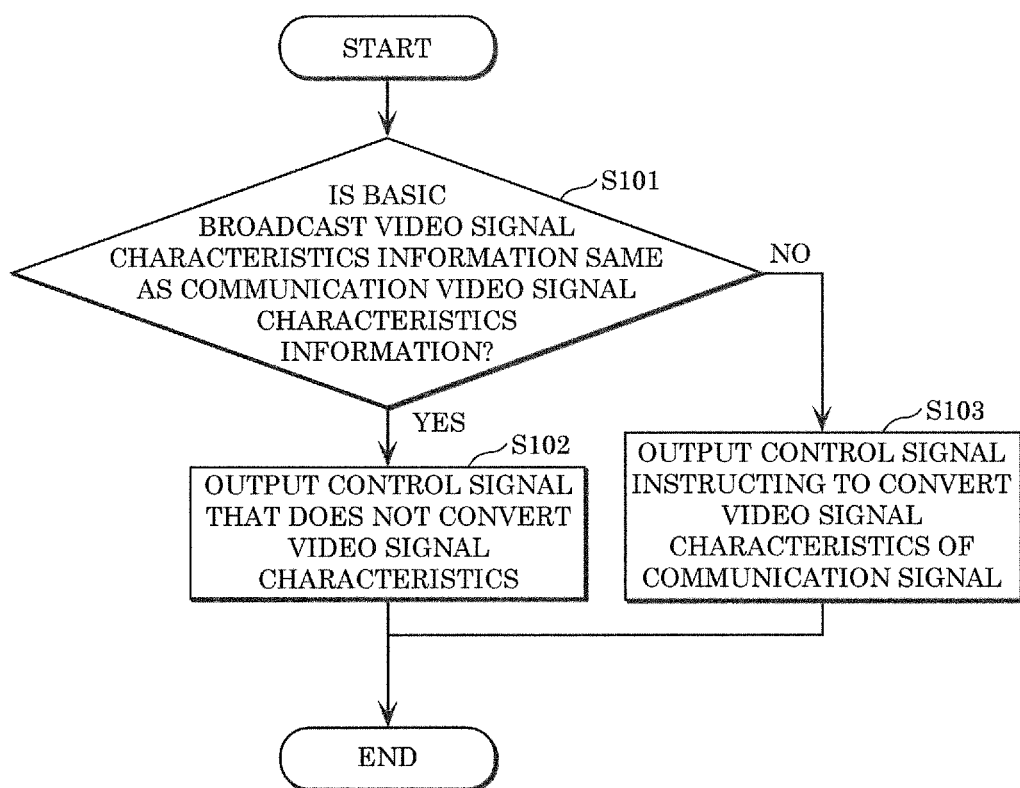
FIG. 10 is a flowchart illustrating one example of operations performed by a receiving device according to an embodiment.

FIG. 10 is a flowchart illustrating operations performed by receiving device 200 according to the present embodiment.

Controller 203 of receiving device 200 determines whether or not the basic broadcast video signal characteristics information and the communication video signal characteristics information are the same (Step S101). Here, when controller 203 determines that these are the same (YES in Step S101), controller 203 outputs, to converter 204, a control signal that does not convert the video signal characteristics of the communication video (Step S102). When controller 203 determines that those are not the same (NO in Step S101), controller 203 outputs, to converter 204, a control signal instructing to convert the video signal characteristics of the communication video (Step S103).

As described above, in the reception method according to the present embodiment, a first image and first image signal characteristics information indicating the image signal characteristics of the first image are received. Next, a second image and second image signal characteristics information indicating the image signal characteristics of the second image are received. Subsequently, when the first image signal characteristics information and the second image signal characteristics information are different, the image signal characteristics of at least one of the first image and the second image is converted to obtain matched image signal characteristics of the first image and the second image. Furthermore, the first image and the second image having the matched image signal characteristics are displayed simultaneously. Here, the first image signal characteristics information and the second image signal characteristics information each indicate at least one of the OETF, the EOTF, the dynamic range, the color gamut, and the white point as image signal characteristics. Here, in the above reception of the first image and the first image signal characteristics information, the first image and the first image signal characteristics information transmitted through communication via a communication network are received. In the above reception of the second image and the second image signal characteristics information, the second image and the second image signal characteristics information transmitted through broadcasting are received. Alternatively, in the above reception of the first image and the first image signal characteristics information, the first image and the first image signal characteristics information transmitted through data broadcasting may be received. Likewise, in the above reception of the second image and the second image signal characteristics information, the second image and the second image signal characteristics information transmitted through basic broadcasting different from data broadcasting may be received.

Figure 11:
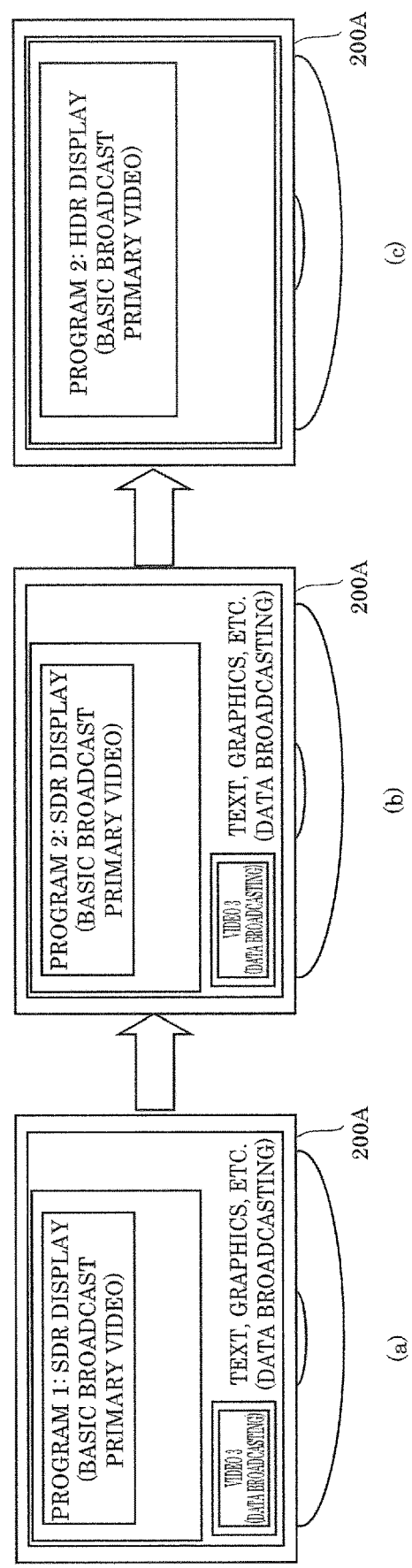
FIG. 11 illustrates an example of transition in an image that is displayed by a receiving device according to an embodiment.

FIG. 11 illustrates an example of transition in an image that is displayed by the receiving device according to the present embodiment.

For example, there are cases where, while the receiving device is displaying a plurality of videos simultaneously, the dynamic range of part of the videos switches from the SDR to the HDR or from the HDR to the SDR or the like. As a characteristic example, it is assumed that the dynamic range of a primary video program switches while the receiving device is displaying a data broadcast image. At this time, if the dynamic range of the luminance of the primary video switches while the data broadcast image is being displayed, visual discomfort would be felt due to a difference in brightness between the video before the switch and the same video after the switch.

Thus, the transmitting and receiving system according to the present embodiment may include receiving device 200A instead of receiving device 200. In receiving device 200A, the dynamic range is fixed while the data broadcast image is being displayed.

For example, while receiving device 200A is displaying a data broadcast image (specifically, video 3 and text, graphics, etc.) and program 1, which is a basic broadcast primary video, as illustrated in (a) of FIG. 11, the primary video switches from program 1 to program 2 as illustrated in (b) of FIG. 11. Here, the dynamic range of program 1 is the SDR, the dynamic range of program 2 is the HDR, and the dynamic range of the data broadcast image has been the SDR since when program 1 was reproduced.

Receiving device 200A according to the present embodiment displays program 2, which is a primary video, with the SDR while the data broadcast image is being displayed with the SDR, as illustrated in (b) of FIG. 11, even after the primary video switches from program 1 having the SDR to program 2 having the HDR. Specifically, receiving device 200A converts the video signal characteristics of program 2 into video signal characteristics for the SDR and applies the SDR EOTF/OETF to program 2. Subsequently, as illustrated in (c) of FIG. 11, receiving device 200A displays program 2 with the HDR after the display of the data broadcast image is ended. Specifically, receiving device 200A does not convert the video signal characteristics of program 2 and applies the HDR EOTF/OETF to program 2.

In this way, in the case where during display of a plurality of videos, the dynamic range of part of the videos upon reception switches, receiving device 200A according to the present embodiment determines whether the video is to be displayed with the HDR or the SDR so that the dynamic range of the video being already displayed does not switch. In other words, receiving device 200A controls whether or not to convert the video signal characteristics of the video being already displayed.

Note that in order that the dynamic range of the basic broadcast primary video being displayed does not switch while the data broadcast image is being displayed, receiving device 200A controls conversion of the video signal characteristics of the primary video. Such control is, however, not limited to the data broadcast image and the basic broadcast primary video; receiving device 200A may perform the above-described control on a plurality of any images. For example, receiving device 200A may perform the above-described control on the communication video and the basic broadcast video.

Figure 12:
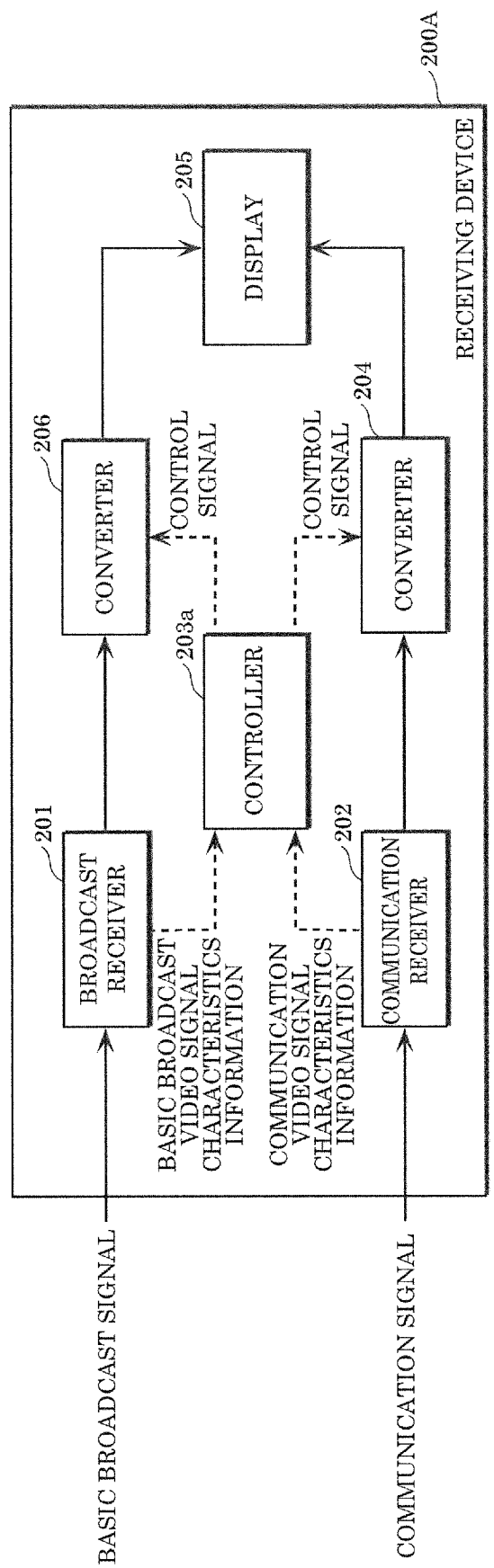
FIG. 12 is a block diagram illustrating another example of the configuration of a receiving device according to an embodiment.

FIG. 12 is a block diagram illustrating another example of the configuration of receiving device 200A according to the present embodiment.

Receiving device 200A includes broadcast receiver 201, communication receiver 202, controller 203a, converters 204 and 206, and display 205.

Broadcast receiver 201 receives a basic broadcast signal and outputs video included in the basic broadcast signal to converter 206. Furthermore, broadcast receiver 201 outputs, as basic broadcast video signal characteristics information to controller 203a, the video signal characteristics information included in the basic broadcast signal.

Communication receiver 202 receives a communication signal, outputs video included in the communication signal to converter 204 as a communication video, and outputs video signal characteristics information included in the communication signal to controller 203a as communication video signal characteristics information.

Controller 203a obtains the basic broadcast video signal characteristics information and the communication video signal characteristics information. Subsequently, on the basis of the basic broadcast video signal characteristics information and the communication video signal characteristics information, controller 203a outputs a control signal to converters 204 and 206. This control signal is for converting both the video signal characteristics of the basic broadcast video and the video signal characteristics of the communication video into the HDR or the SDR. Specifically, in the case where during display of the basic broadcast video and the communication video, the video signal characteristics of one of the videos switch, that is, these videos have different video signal characteristics, controller 203a outputs a control signal for converting the video signal characteristics of the one of the videos. As a result of this conversion, the video signal characteristics of one of the videos are the same before and after the switch, and the video signal characteristics of both the videos are maintained in the same state.

Note that in the case where when the video signal characteristics of one of the above-described videos are being converted, that video signal characteristics switch, controller 203a may cause converter 204 or 206 to stop the conversion so that the video signal characteristics of both the videos are maintained in the same state. Specifically, as a result of converter 204 converting the video signal characteristics of the communication video from the SDR to the HDR, both the basic broadcast video and the communication video are displayed with the HDR. In such a situation, when the video signal characteristics of the video being received by communication receiver 202 switch from the SDR to the HDR, controller 203a causes converter 204 to stop the conversion being performed by converter 204. Thus, both the basic broadcast video and the communication video can be continuously displayed with the HDR before and after the switch of the video signal characteristics.

Converter 204 obtains the communication video from communication receiver 202 and converts the video signal characteristics of the communication video on the basis of the control signal output from controller 203a. Furthermore, converter 204 may obtain, from controller 203a, video signal characteristics information corresponding to the converted video signal characteristics, and apply the video signal characteristics information to the communication video having the converted video signal characteristics. By this application, converter 204 converts the data format of the communication video into a data format supported by display 205. For example, converter 204 applies the EOTF to convert a code value included in the communication video into luminance. Converter 204 outputs such a communication video in the converted data format to display 205.

Converter 206 obtains the basic broadcast video from broadcast receiver 201 and converts the video signal characteristics of the basic broadcast video on the basis of the control signal output from controller 203a. Furthermore, converter 206 may obtain, from controller 203a, video signal characteristics information corresponding to the converted video signal characteristics, and apply the video signal characteristics information to the basic broadcast video having the converted video signal characteristics. By this application, converter 206 converts the data format of the basic broadcast video into a data format supported by display 205. For example, converter 206 applies the EOTF to convert a code value included in the basic broadcast video into luminance. Converter 206 outputs such a basic broadcast video in the converted data format to display 205.

Display 205 is a display device and simultaneously displays the basic broadcast video output from converter 206 and the communication video output from converter 204.

Figure 13:
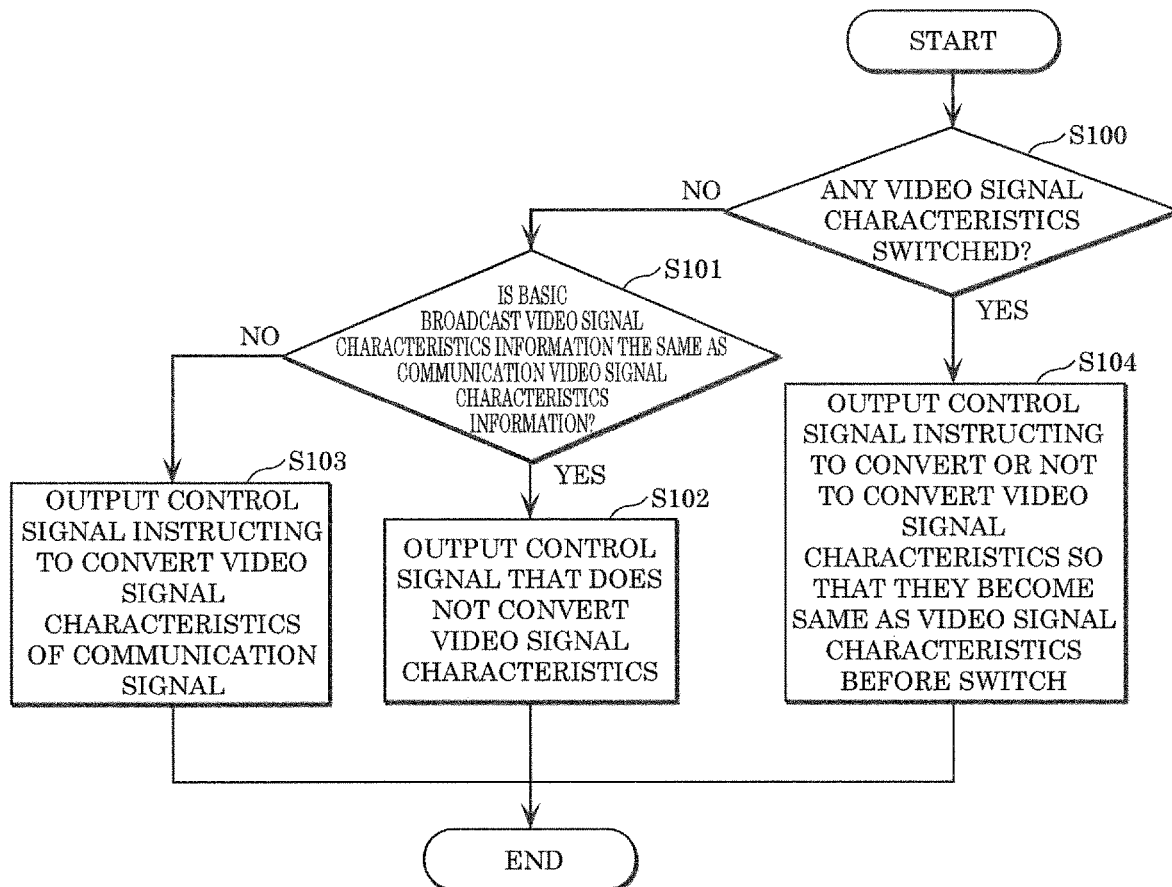
FIG. 13 is a flowchart illustrating another example of operations performed by a receiving device according to an embodiment.

FIG. 13 is a flowchart illustrating operations performed by receiving device 200A according to the present embodiment.

First, controller 203a of receiving device 200A determines whether or not the video signal characteristics of any of the plurality of videos being displayed have switched (Step S100). Here, when the video signal characteristics are determined to have switched (YES in Step S100), controller 203a outputs, to converter 204 or 206, a control signal instructing to convert or not to convert the video signal characteristics so that the video signal characteristics are the same before and after the switch.

When the video signal characteristics are determined to have not switched (NO in Step S100), controller 203a determines whether or not the basic broadcast video signal characteristics information and the communication video signal characteristics information are the same (Step S101). Here, when controller 203a determines that these are the same (YES in Step S101), controller 203a outputs, to converters 204 and 206, a control signal that does not convert the video signal characteristics (Step S102). When controller 203a determines that those are not the same (NO in Step S101), controller 203a outputs, to converter 204 and converter 206, a control signal instructing to convert the video signal characteristics of at least one of the basic broadcast video and the communication video (Step S103).

As described above, in the reception method according to the present embodiment, when, while the first image and the second image are being displayed simultaneously, only the image signal characteristics indicated in the second image signal characteristics information among the first image signal characteristics information and the second image signal characteristics information that are being received switch, the image signal characteristics of the second image after the switch is converted, or conversion that is being performed on the image signal characteristics of the second image before the switch is stopped, to obtain matched image signal characteristics of the first image and the second image. The first image and the second image having the matched image signal characteristics are displayed simultaneously after the conversion of the image signal characteristics of the second image is performed or stopped.

Accordingly, even when only the image signal characteristics of the second image switch, the image signal characteristics of the first and second images being displayed can remain the same before and after the switch. Thus, the feeling of visual discomfort due to the switch can be suppressed.

SUMMARY

Figure 14A:
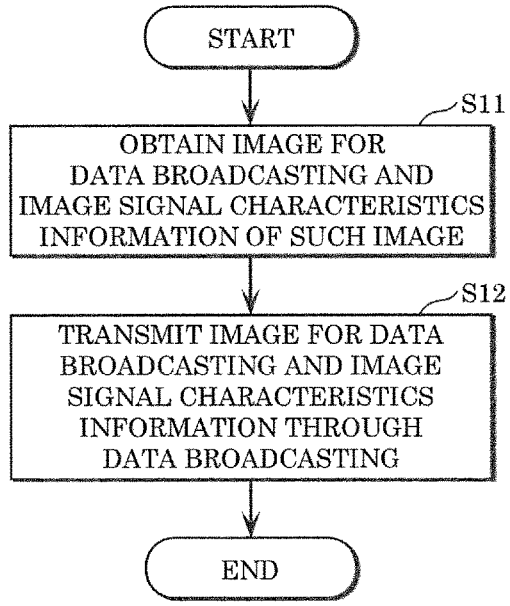
FIG. 14A is a flowchart illustrating a transmission method according to one aspect of the present disclosure.

FIG. 14A is a flowchart illustrating a transmission method according to one aspect of the present disclosure.

The transmission method according to one aspect of the present disclosure includes Step S11 and Step S12. In Step S11, an image for the data broadcasting and image signal characteristics information indicating the OETF or the EOTF as the image signal characteristics of the image are obtained. In Step S12, a data broadcast signal including the image for the data broadcasting and the image signal characteristics information is transmitted through the data broadcasting.

Figure 14B:
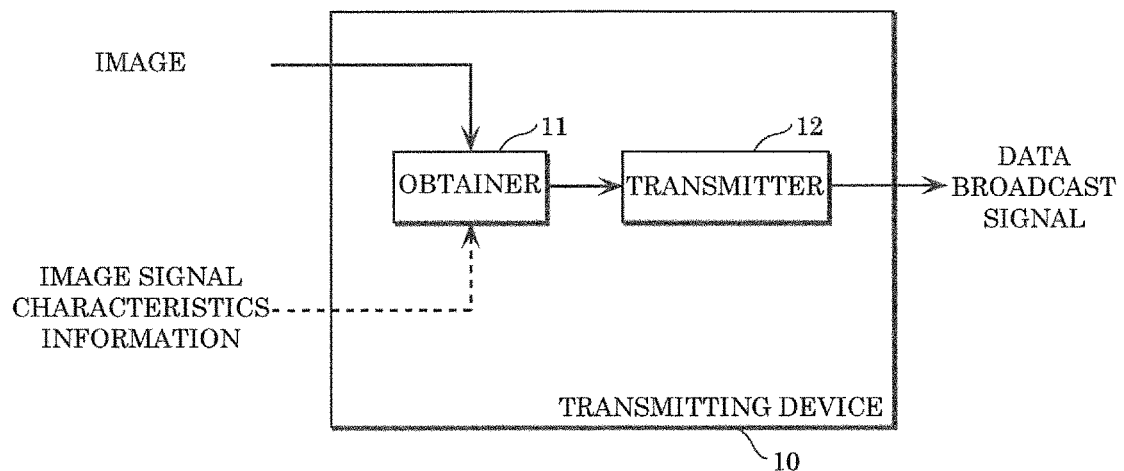
FIG. 14B is a block diagram illustrating the configuration of a transmitting device according to one aspect of the present disclosure.

FIG. 14B is a block diagram illustrating the configuration of a transmitting device according to one aspect of the present disclosure.

Transmitting device 10 according to one aspect of the present disclosure includes obtainer 11 and transmitter 12. Obtainer 11 obtains an image for the data broadcasting and image signal characteristics information indicating the OETF or the EOTF as the image signal characteristics of the image. Transmitter 12 transmits a data broadcast signal including the image for the data broadcasting and the image signal characteristics information through the data broadcasting.

Thus, according to whether the dynamic range of an image (for example, graphics) for the data broadcasting is the SDR or the HDR, a data broadcast signal including image signal characteristics information indicating the corresponding OETF or EOTF is transmitted through the data broadcasting. In other words, even in an environment in which provision of graphics created with the SDR through the data broadcasting and provision of graphics created with the HDR through the data broadcasting are mixed, the corresponding OETF or EOTF is transmitted together with such graphics through the data broadcasting. Therefore, even in such an environment, a receiving device, such as a television, can display an image, such as graphics, for data broadcasting with an appropriate dynamic range by using the corresponding OETF or EOTF.

Figure 15A:
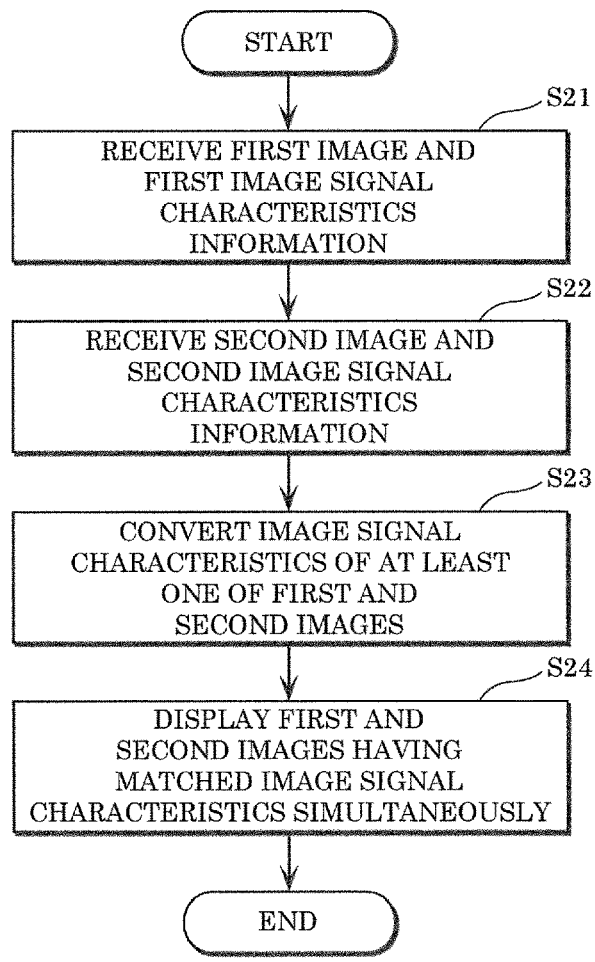
FIG. 15A is a flowchart illustrating a reception method according to one aspect of the present disclosure.

FIG. 15A is a flowchart illustrating a reception method according to one aspect of the present disclosure.

The reception method according to one aspect of the present disclosure includes Steps S21 to S24.

In Step S21, a first image and first image signal characteristics information indicating the image signal characteristics of the first image are received. In Step S22, a second image and second image signal characteristics information indicating the image signal characteristics of the second image are received. In Step S23, when the first image signal characteristics information and the second image signal characteristics information are different, the image signal characteristics of at least one of the first image and the second image is converted to obtain matched image signal characteristics of the first image and the second image. In Step S24, the first image and the second image having the matched image signal characteristics are displayed simultaneously.

Figure 15B:
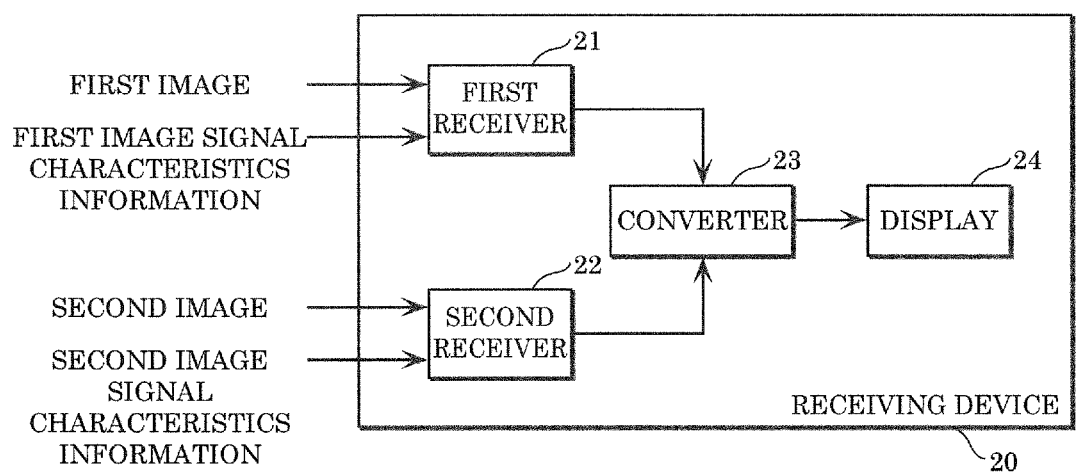
FIG. 15B is a block diagram illustrating the configuration of a receiving device according to one aspect of the present disclosure.

FIG. 15B is a block diagram illustrating the configuration of a receiving device according to one aspect of the present disclosure.

Receiving device 20 according to one aspect of the present disclosure includes first receiver 21, second receiver 22, converter 23, and display 24.

First receiver 21 receives a first image and first image signal characteristics information indicating the image signal characteristics of the first image. Second receiver 22 receives a second image and second image signal characteristics information indicating the image signal characteristics of the second image. When the first image signal characteristics information and the second image signal characteristics information are different, converter 23 converts the image signal characteristics of at least one of the first image and the second image to obtain matched image signal characteristics of the first image and the image signal characteristics of the second image. Display 24 simultaneously displays the first image and the second image having the matched image signal characteristics.

Accordingly, when the image signal characteristics of the first image are SDR OETF or EOTF, for example, and the image signal characteristics of the second image are HDR OETF or EOTF, for example, the first and second images having the same OETF or EOTF are displayed simultaneously. Thus, it is possible to make the first and second images more eye-friendly.

Note that in the embodiment described above, each of the structural elements may be configured in the form of an exclusive hardware product or may be realized by executing a software program suitable for each of the structural elements. Each of the structural elements may be realized by means of a program executing unit, such as a central processing unit (CPU) and a processor, reading and executing the software program recorded on a recording medium such as a hard disk or a semiconductor memory. Here, software for implementing the transmitting device or the receiving device according to the above embodiment is a program which causes a computer to execute the steps included in the flowchart illustrated in FIG. 10, FIG. 13, FIG. 14A, or FIG. 15A.

Although the transmitting device and the receiving device according to one or more aspects are described thus far based on the embodiment, the present disclosure is not limited to this embodiment. Various modifications of the present embodiment as well as embodiments resulting from combinations of structural elements of the different embodiments that may be conceived by those skilled in the art may be included within the scope of one or more aspects as long as these do not depart from the essence of the present disclosure.

INDUSTRIAL APPLICABILITY

The present disclosure produces the advantageous effect of displaying an image appropriately and can be used, for example, as a transmitting device which transmits images such as a television video, a caption, text, or graphics through broadcasting or communication and a receiving device, such as a television, which receives and displays such images.

What is claimed is:

1. A reception method, performed by a receiving device, the reception method comprising:
    receiving a first content and characteristics information of the first content, the first content conforming to High Dynamic Range (HDR), the characteristics information indicating one of an opto-electrical transfer function (OETF) and an electro-optical transfer function (EOTF);
    receiving a second content to be displayed with the first content, the second content conforming to Standard Dynamic Range (SDR), the second content including at least one of a caption or an image;
    determining whether a scale factor is received, the scale factor being described in Timed Text Markup Language (TTML);
    converting the second content to a first converted content with the scale factor such that the first converted content conforms to HDR if the scale factor is determined to be received; and
    converting the second content to a second converted content with a default value such that the second converted content conforms to HDR if the scale factor is not determined to be received, the default value being stored in the receiving device.

2. The reception method according to claim 1, wherein the first content and the characteristics information are received from a first network, and
    the second content and the scale factor are received from a second network.

* * * * *